United States Patent [19]

Schuller et al.

[11] Patent Number: 5,123,819
[45] Date of Patent: Jun. 23, 1992

[54] PRESSURE FLUID PUMPING DEVICE WITH A RECIPROCATING PISTON PUMP

[75] Inventors: Wolfgang Schuller, Bietigheim-Bissingen; Hans Feeser, Vaihingen/Enz-Aurich; Rolf Hummel, Steinenbronn; Michael Klose, Besigheim; Guenter Krenz, Steinheim, all of Fed. Rep. of Germany

[73] Assignee: Robert Bosch GmbH, Stuttgart, Fed. Rep. of Germany

[21] Appl. No.: 643,319

[22] Filed: Jan. 22, 1991

[30] Foreign Application Priority Data

Mar. 3, 1990 [DE] Fed. Rep. of Germany ....... 4006758
Sep. 12, 1990 [DE] Fed. Rep. of Germany ....... 4028941

[51] Int. Cl.⁵ .................................................. F04B 21/02
[52] U.S. Cl. ........................................ 417/569; 417/273; 137/330; 137/543.17
[58] Field of Search ............... 417/569, 273; 137/330, 137/539, 539.5, 543.17

[56] References Cited

U.S. PATENT DOCUMENTS

| | | | |
|---|---|---|---|
| 1,852,033 | 4/1932 | Summers | 417/569 |
| 2,914,085 | 11/1959 | Mercier | 137/539.5 |
| 3,238,887 | 3/1966 | Volz | 417/562 |
| 3,310,000 | 3/1967 | Martin | 417/420 |
| 3,434,428 | 3/1969 | Liles | 417/273 |
| 3,937,250 | 2/1976 | Golan et al. | 137/543.17 |
| 4,099,894 | 7/1978 | Indra | 417/569 |

Primary Examiner—Richard A. Bertsch
Assistant Examiner—Charles G. Freay
Attorney, Agent, or Firm—Edwin E. Greigg; Ronald E. Greigg

[57] ABSTRACT

The invention seeks to reduce structure-borne sound emissions of the reciprocating piston pump. The reciprocating pump is includes an outlet valve, which has a valve seat and a valve closing body that is received in a hollow space and is loaded by a closing spring. One outlet bore radially originates at the circumferential region of the valve seat and branches off from the hollow space. The opening of the outlet bore toward the hollow space extends at least approximately between the valve seat and the end toward the closing spring of the gap of least cross section, which is formed between the valve closing body and the inside circumference of the hollow space. As a result, a slowed opening motion of the valve closing element is attained, in which opening motion an opening gap opens up that has its largest flow cross section in the region of the outlet bore. The supply flow, which increases slowly as the outlet valve opens, results in a slowed force variation speed in the drive train of the reciprocating piston pump and a reduced emission of structure-borne sound. The pressure fluid pumping device may be used for instance in hydraulic motor vehicle brake systems having an anti-skid system and/or traction control system.

16 Claims, 2 Drawing Sheets

PRESSURE FLUID PUMPING DEVICE WITH A RECIPROCATING PISTON PUMP

BACKGROUND OF THE INVENTION

A pressure fluid pumping device is already known (German Patent Application P 39 07 927.4) in which at least two diametrically opposed outlet bores of an outlet conduit for pressure fluid lead from the relatively small-volume hollow space of the housing of an outlet valve having a ball as its valve closing body, into a chamber of a pump housing. This chamber has a relatively large volume and communicates downstream, through a throttle bore, with a pressure fluid line. With its embodiment, because of the compressibility of the pressure fluid in the chamber and the elasticity of the pump housing wall defining the chamber, damping of the pulsations in the flow of pressure fluid unevenly expelled from the reciprocating piston pump is attained. Nevertheless, the known pressure fluid pumping device is not entirely satisfactory in terms of noise because the outlet valve opens abruptly in the pumping stroke of the reciprocating piston pump until the valve opening cross section is completely opened. As a result, not only are there compression impacts but also abrupt variations in force in the drive train of the reciprocating piston pump, this generating noise that is transmitted as structureborne sound to the structural parts, for instance of a motor vehicle, that carry the pressure fluid pumping device and is difficult to damp.

OBJECT AND SUMMARY OF THE INVENTION

The pressure fluid pumping device according to the invention has the advantage over the prior art that a variation in the opening characteristic of the outlet valve is attained as a result, and because of this the reciprocating piston pump produces less noise. Upon opening, the outlet valve closing element in fact executes a tilting or hingelike motion, upon which an opening gap between the valve seat and the valve closing element opens up toward the outlet opening; the pressure fluid overflows from this gap into the outlet conduit at a feed rate that increases relatively slowly. Accordingly, the force variation speed in the drive train of the reciprocating piston pump is slowed, and there is less emission of structure-borne and airborne sound.

One of the embodiments defined herein is especially advantageous, because the favorable outflow of pressure fluid from the valve opening cross section allows very effective noise abatement.

Further features of the pressure fluid pumping device is disclosed in which with the use of different shapes of valve closing elements, a favorable opening characteristic of the outlet valve is attained.

The correlation of the dimensions of the hollow space and the outlet bore reveals a teaching that enables the necessary structural modifications of the outlet valves, required for instance because of the size of the closing spring in the hollow space or a predetermined diameter of the outlet bore, while still allowing a considerable reduction in noise emissions.

Another advantage is attained by a further feature which makes it possible to attain favorable flow dynamics conditions, which reduce noise emissions.

Still another feature disclosed has the advantage that the opening motion of the valve closing body is additionally slowed because the valve closing element, along with the hollow space, acts like a hydraulic damping element, with the gap acting as a throttle. This enables still more effective noise abatement.

With the embodiment of the pressure fluid pumping device defined hereinafter, the valve closing body is enabled to securely find the valve seat and center itself, especially if the valve seat has a conical seat face. Alignment errors that prevent the element from finding its way into the valve seat are in fact avoided if the hollow space toward the valve seat, which exerts a centering function upon the valve closing element, and the valve seat are combined in one structural part and manufactured in a chuck, conventionally using metalcutting techniques.

The further feature of the pressure fluid pumping device disclosed makes it simple, by suitable embodiment of the outlet valve housing, to vary the volume of the hollow space in order to attain the various damping characteristics to meet requirements.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
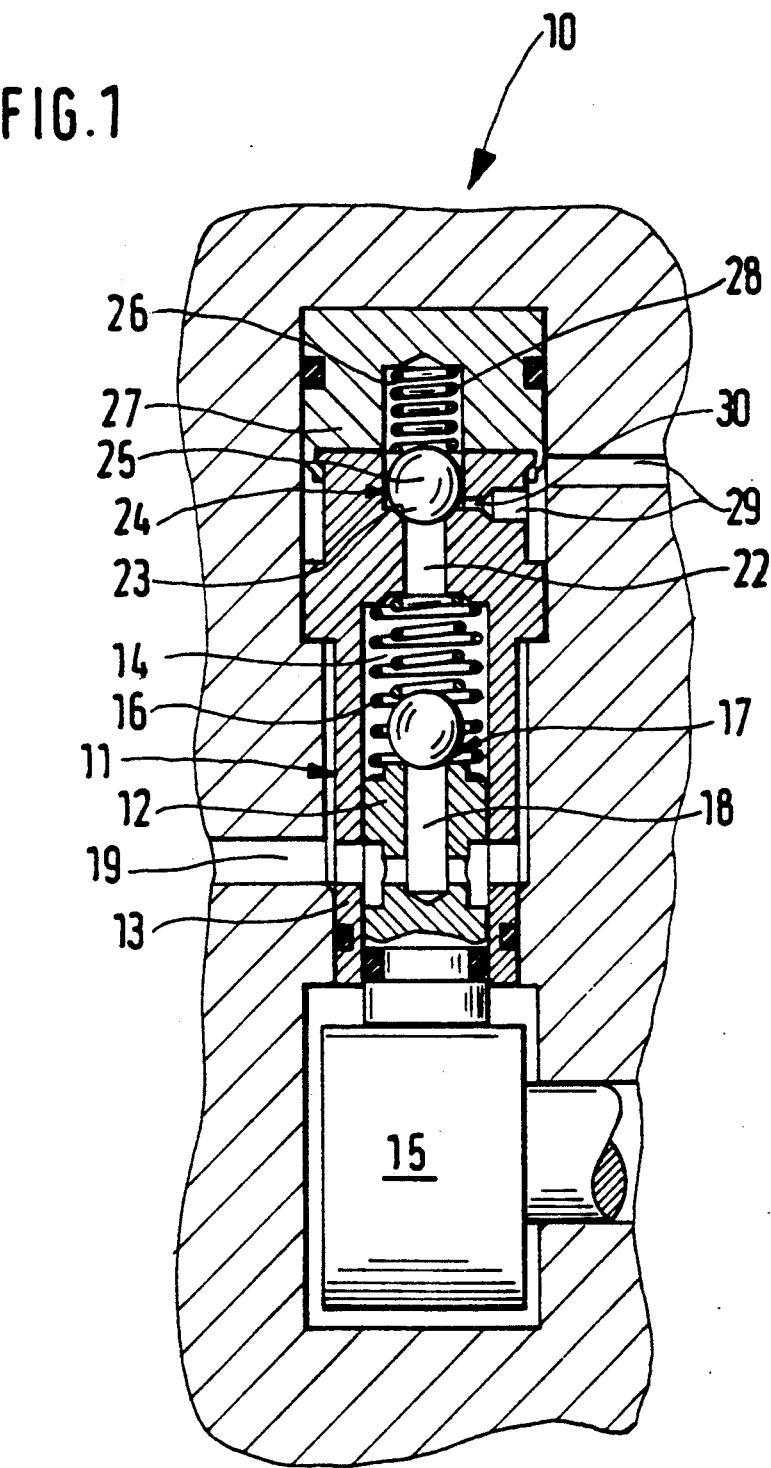
FIG. 1, showing the first exemplary embodiment, is a longitudinal section through a pressure fluid pumping device having a reciprocating piston pump with an outlet valve, from the valve seat of which, cooperating with a ball as the valve closing element, an outlet bore branches off laterally.

The pressure fluid pumping device 10 shown in FIG. 1 has a reciprocating piston pump 11. The reciprocating piston pump 11 has a pump piston 12 that is guided, longitudinally displaceably, in a pump cylinder 13 having a positive displacement chamber 14. The pump piston 12 is drivable by an eccentric 15 counter to the force of a compression spring 16 disposed in the positive displacement chamber 14. Cooperating with the pump piston 12 is an inlet valve 17 disposed in the positive displacement chamber 14. A longitudinally extending intake conduit 18, which communicates with an inlet conduit 19 for pressure fluid, is located in the pump piston 12.

An outflow bore 22 extends coaxially with the pump cylinder 13, originating at the positive displacement chamber 14, and ends in an annular valve seat 23 of an outlet valve 24. Cooperating with the valve seat 23 as a valve closing body is a ball 25. The ball 25 is received in a hollow space 26 of circular-cylindrical cross section, which extends in the pump cylinder 13 coaxially with the longitudinal pump axis, beginning at the valve seat 23. On the side of the pump cylinder 13 remote from the eccentric 15, the hollow space 26 is continued coaxially in a cylinder head 27 joined to the pump cylinder 13. On the side remote from the valve seat 23, a closing spring 28, which urges the ball 25 toward the valve seat 23, is received in the hollow space 26. From the hollow space 26, an outlet bore 30 that communicates with an outlet conduit 29 for pressure fluid branches laterally downstream of the valve 23.

The pressure fluid pumping device 10 is part of a hydraulic motor vehicle brake system, not shown, having an anti-lock system and/or traction control system.

Figure 2:
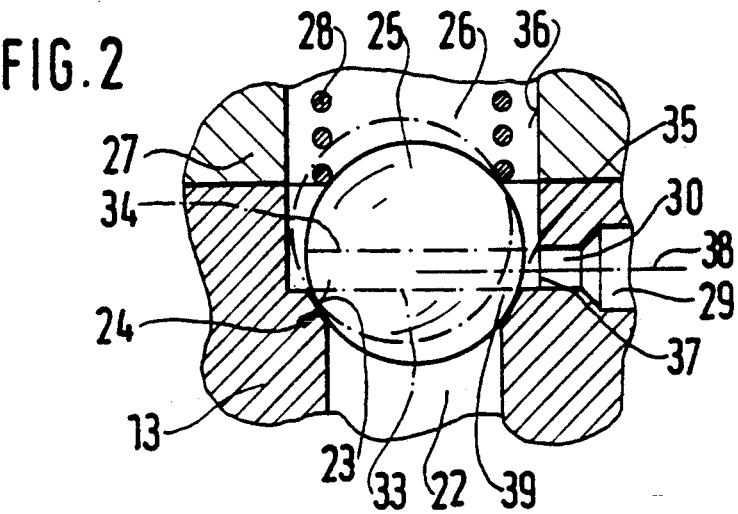
FIG. 2 is an enlarged sectional view of the outlet valve of FIG. 1.

The mode of operation of the pressure fluid pumping device 10 is essentially as follows:

In the downward stroke of the pump piston 12, the inlet valve 17 opens, and pressure fluid is received in the positive displacement chamber 14 through the inlet conduit 19 and the intake conduit 18. During this intake stroke, the outlet valve 24 is closed. Upon the upward stroke (working stroke) of the pump piston 12, contrarily, the inlet valve 17 is closed, and pressure fluid is expelled from the positive displacement chamber 14 through the outflow bore 22, overcoming the outlet valve 24, through the outlet bore 30 into the outlet conduit 29. In this process the opening characteristic of the outlet valve 24 is influenced by the provisions described below:

In the outlet valve 24, shown in FIG. 2 as an enlarged detail of the first exemplary embodiment of the pressure fluid pumping device 10 shown in FIG. 1, it can be clearly seen that the valve seat 23 is defined toward the hollow space by a plane 33 extending transversely to the longitudinal pump axis. The ball 25 engaging the valve seat 23 under the influence of the closing spring 28 has a great circle 34 extending parallel to the plane 33 of the valve seat 23. Toward the hollow space 26, this great circle defines a gap 35 between the ball 25 and the inside circumference 36 of the hollow space 26. The outlet bore 30 which branches off radially from the hollow space 26 is disposed such that the openings 37 toward the hollow space extends between the plane 33 of the valve seat 23 and the great circle 34 of the ball, at which the gap 35 has its smallest cross section. Thus the longitudinal axis 38 of the outlet bore 30 extends between the plane 33 and the great circle 34 of the ball.

The radial width of the gap 35 between the ball 25 and the inside circumference 36 of the hollow space 26 is of substantial importance for damping of the opening motion of the ball. The minimum radial width of the gap 35 may be between 1/100 and 5/100 of the ball diameter, and is preferably a width of 2/100 of the ball diameter, which for a ball 5 mm in diameter amounts to 0.1 mm. (In the drawing, the gap 35 is shown as exaggeratedly wide.) A gap 35 of this kind acts in a centering manner upon the ball 25 upon closure of the outlet valve 24. Alignment errors between the valve seat 23 and the inside circumference 36 of the hollow space 26 would therefore prevent the ball 25 from finding the valve seat 23 and would prevent centering of the ball in it upon the closing process of the outlet valve 24. Part of the hollow space 26 toward the valve seat is therefore, like the valve seat 23, disposed in the pump cylinder 13. This part of the hollow space 26, which extends axially to beyond the great circle 34, can therefore be machined in a metal-cutting fashion along with the valve seat 23 in the same chuck, for instance in an automatic lathe, which avoids alignment errors. Moreover, the part of the hollow space 26 receiving the closing spring 28 is located in the cylinder head 27.

Because of the asymmetrical disposition of the opening 37 of the single outlet bore 30, with respect to the longitudinal pump axis, the ball 25 executes an opening motion in the working stroke of the pump piston 12, in the course of which the ball, beginning in the region of the outlet bore 30, lifts up from the valve seat 23 and forms an opening gap 39 that is not uniform with respect to the valve seat circumference, but remains supported on the region of the valve seat 23 remote from the opening 37 of the outlet bore 30. The ball 25 assumes an opening position shown in dot-dash lines in this process. Since the outlet bore 30 forms a throttle restriction for the pressure fluid, the crosssectional area of this bore being matched to the smallest radial width of the gap 35 and/or to the pressure fluid holding volume of the hollow space 26, the tilting motion of the ball 25 into its opening position is damped. The motion damping is especially effective if the gap 35 and/or the pressure fluid holding volume of the hollow space 26 is very small. A very narrow gap 35 and/or a very small pressure fluid holding volume allow a large cross section of the outlet bore 30. Conversely, the reduced damping action of a wider gap 35 and/or of a hollow space 26 having a larger pressure fluid holding volume, can be compensated for by an outlet bore 30 of smaller cross section. The motion damping of the ball 25 in the opening process has the result that the flow of pressure fluid through the outlet bore 30 increases relatively slowly, resulting in a slowed force variation speed in the drive train of the reciprocating piston pump 11. Structure-borne sound thus occurs to a reduced extent.

Figure 3:
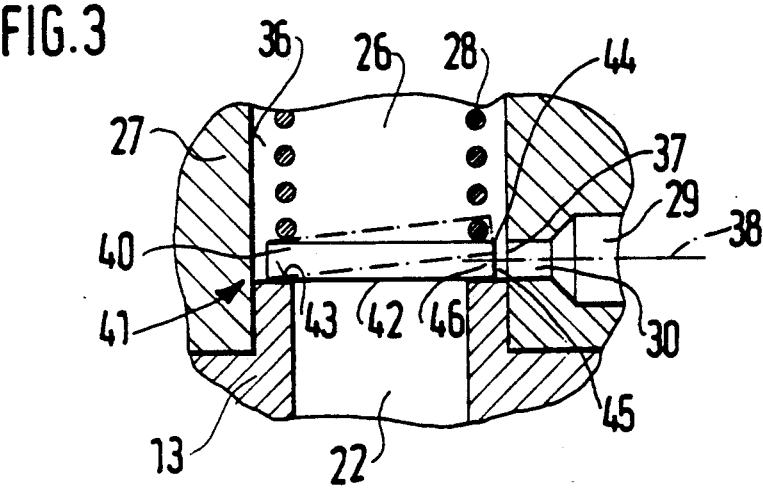
FIG. 3 is a view corresponding to FIG. 2 showing the second exemplary embodiment, in the form of an outlet valve the closing element of which is a plate.

The second exemplary embodiment shown in FIG. 3 for the pressure fluid pumping device differs from the first essentially in that the circular plate 40 with parallel boundaries is used as the valve closing body of the outlet valve 41. In the closing position of the outlet valve 41, the plane 42 of the valve seat 43 coincides with the underside of the plate 40. The opening 37 of the outlet bore 30 toward the hollow space extends between this plane 42 and the top of the plate 40, which forms an encompassing edge 44 toward the closing spring. The opening 37 thus does not extend beyond the gap 45 between the inside circumference 3 of the hollow space 26 and the plate 40. The hollow space 26 is also embodied by the cylinder head 27. However, as in the first exemplary embodiment, the hollow space may be made partly in the pump cylinder 13 and partly in the cylinder head 27.

In the working stroke of the pump piston 12, the plate 40 executes an opening motion similar to that of a hinge. In its opening position, shown in dot-dash lines, it forms an opening gap 46 facing the outlet bore 30; the longitudinal axis 38 of the outlet bore 30 points into this opening gap 46.

Figure 4:
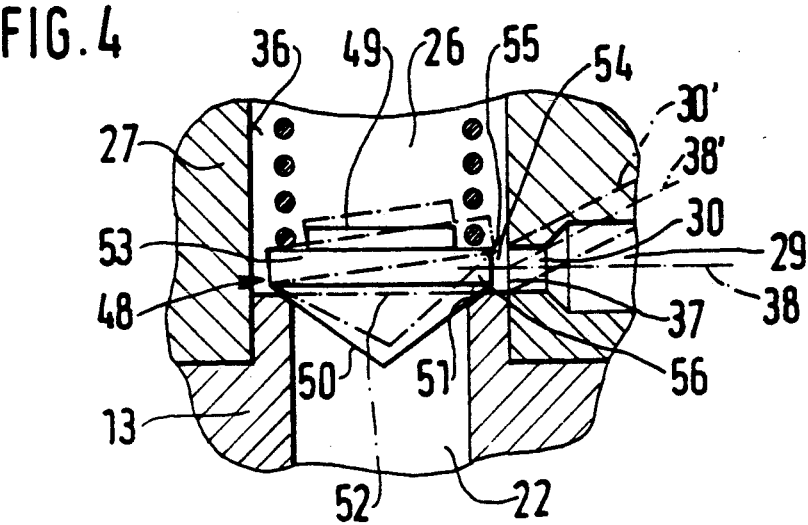
FIG. 4, again in the form of an enlarged sectional view, shows the third exemplary embodiment in the form of an outlet valve having a conical valve closing member.

In the third exemplary embodiment shown in FIG. 4, the outlet valve 48 of the pressure fluid pumping device has a valve closing body, essentially embodied as a cone 49, with a conical sealing face 50. The valve seat 51 of the outlet valve 48, which is embodied to fit, is defined toward the hollow space 26 by a plane 62. Beginning at the conical sealing face 50, the valve closing body 49 is continued with a cylindrical segment 53, which with the inside circumference 36 of the hollow space 26 forms a gap 54. The opening 37 of the outlet bore 30 toward the hollow space extends in this exemplary embodiment as well between the plane 52 of the valve seat 51 and the end of the gap 54, which is defined by an encompassing edge 55, toward the closing spring, of the cylindrical valve closing body segment 53. The hollow space 26 formed by the cylinder head 27 can once again be made partly in the pump cylinder 13 and partly in the cylinder head.

On the working stroke of the pump piston 12, the cone 49, serving as a valve closing body, shifts to an opening position (shown in dot-dash lines), in which the opening gap 56 between the valve seat 51 and the cone 49 has its largest cross section, in the region of the outlet bore 30.

Deviating from the three exemplary embodiments, the outlet bore may also extend at an acute angle, i.e., an angle between 0° and 90°, with respect to the plane of the valve seat. This is shown in dot-dash lines in the exemplary embodiment of FIG. 4, where the longitudinal axis 38' of the outlet bore 30' forms an angle of approximately 30° with the plane 52 defining the valve seat 51. This same course can be realized in the exemplary embodiments as well.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure fluid pumping device (10) having a reciprocating piston pump (11), a drivable pump piston (12), which is guided longitudinally displaceably in a pump cylinder (13) having a positive displacement chamber (14); an outlet valve (24; 41; 48) is connected to the positive displacement chamber (14); a hollow space (26) disposed coaxially with the pump cylinder (13) and arranged to receive a valve closing body and a closing spring (38) therein, the value closing is loaded directly by the closing spring (28) which is adapted to urge the valve closing body toward a valve seat; said hollow space (26) beings at the valve seat and extends inside the pump cylinder (13) at least as far as a gap (35, 45, 54) having a smallest cross section between the valve closing body and the pump cylinder (13) and arranged to communicate downstream of the valve seat via only one outlet bore (30) with an outlet conduit (29) for pressure fluid; said only one outlet bore (30) is formed as a throttle restriction disposed at least approximately radially from the circumferential region of the valve seat which branches off from the hollow space (26) to the outlet conduit (29); and in an opening (37) of the outlet bore (30) toward the hollow space (26) extends at least approximately between the valve seat and a zone toward the closing spring adjacent to the gap of smallest cross section, that is formed between the valve closing body and the inside circumference (36) of the hollow space (26).

2. A pressure fluid pumping device as defined by claim 1, in which the outlet bore (30), with its opening (37), preferably borders on a plane that defines the valve seat toward the closing spring, and further includes a longitudinal axis (38) which is adjacent to an opening gap formed by the valve seat and the valve closing body.

3. A pressure fluid pumping device as defined by claim 1, in which said valve closing body is in the form of a ball (25), and the opening (37) of the outlet bore (30) extends at most to a height corresponding to a great circle (34) of the ball which extends parallel to the valve seat (23).

4. A pressure fluid pumping device as defined by claim 1, in which the valve closing body comprises a plate (40), and the opening (37) of the outlet bore (30) terminates adjacent to an encompassing edge (44) of said plate toward the closing spring of the plate.

5. A pressure fluid pumping device as defined by claim 1, in which the valve closing body comprises a cone (49) which includes a cylindrical segment (53) on a side toward the closing spring (28) and a dependent conical sealing face (50) toward said valve seat and the opening (37) of bore (30) terminates, adjacent to an encompassing edge (55) of said valve closing body on a side of the closing spring (28).

6. A pressure fluid pumping device as defined by claim 1, in which the cross-sectional area of said throttle restriction is adapted to the width of the gap.

7. A pressure fluid pumping device as defined by claim 1, in which the cross-sectional area of said throttle restriction is adapted to the holding volume of the hollow space.

8. A pressure fluid pumping device as defined by claim 1, in which the cross-sectional area of said throttle restriction is adapted to the width of said gap and to the holding volume of the hollow space (26).

9. A pressure fluid pumping device as defined by claim 1, in which the outlet bore (30'), with its longitudinal axis (38'), forms an angle with a plane of the valve seat that is between 0° and 90°.

10. A pressure fluid pumping device as defined by claim 2, in which said outlet bore (30'), with its longitudinal axis (38'), forms an angle with a plane of the valve seat that is between 0° and 90°.

11. A pressure fluid pumping device as defined by claim 3, in which said outlet bore (30'), with its longitudinal axis (38'), forms an angle with a plane of the valve seat that is between 0° and 90°.

12. A pressure fluid pumping device as defined by claim 4, in which said outlet bore (30'), with its longitudinal axis (38'), forms an angle with a plane of the valve seat that is between 0° and 90°.

13. A pressure fluid pumping device as defined by claim 5, in which said outlet bore (30'), with its longitudinal axis (38'), forms an angle with a plane of the valve seat that is between 0° and 90°.

14. A pressure fluid pumping device as defined by claim 1, in which said gap has a radial width of from 1/100 to 5/100, of the diameter of the valve closing body.

15. A pressure fluid pumping device as defined by claim 11, in which the hollow space (26) is coextensive with a bore in a cylinder heat (27) that closes off the pump cylinder (13).

16. A pressure fluid pumping device as defined by claim 15, in which the closing spring (28) is confined within said bore in said cylinder head.

* * * * *